US010498426B2

(12) United States Patent
Cedergren et al.

(10) Patent No.: US 10,498,426 B2
(45) Date of Patent: Dec. 3, 2019

(54) BEAM SWITCHING IN A CELLULAR NETWORK WHERE THE NETWORK NODES SUPPORT A PLURALITY OF BEAMS

(71) Applicant: Telefonaktiebolaget LM Ericsson (publ), Stockholm (SE)

(72) Inventors: Andreas Cedergren, Bjärred (SE); Andres Reial, Malmö (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 4 days.

(21) Appl. No.: 15/576,921

(22) PCT Filed: Jun. 12, 2015

(86) PCT No.: PCT/EP2015/063219
§ 371 (c)(1),
(2) Date: Nov. 27, 2017

(87) PCT Pub. No.: WO2016/198124
PCT Pub. Date: Dec. 15, 2016

(65) Prior Publication Data
US 2018/0152232 A1 May 31, 2018

(51) Int. Cl.
H04B 7/02 (2018.01)
H04B 7/06 (2006.01)
(Continued)

(52) U.S. Cl.
CPC .......... H04B 7/0695 (2013.01); H04B 7/088 (2013.01); H04W 36/30 (2013.01);
(Continued)

(58) Field of Classification Search
CPC ..... H04B 7/0695; H04B 7/088; H04W 36/30; H04W 52/143; H04W 52/243;
(Continued)

(56) References Cited

U.S. PATENT DOCUMENTS

2005/0070266 A1 3/2005 Senarath et al.
2014/0073329 A1 3/2014 Kang et al.
(Continued)

FOREIGN PATENT DOCUMENTS

EP 1507427 A1 2/2005
EP 1562306 A1 8/2005
(Continued)

*Primary Examiner* — Zewdu A Kassa
(74) *Attorney, Agent, or Firm* — Coats & Bennett, PLLC

(57) ABSTRACT

A method for a network node of a cellular communication network is disclosed. The network node and at least some other network nodes of the cellular communication network are each adapted to support a plurality of beams of a signal beam-forming scheme and to communicate with a wireless communication device using at least one of the plurality of beams. The method comprises initiating a mobility procedure, identifying interfering signals transmitted by one or more interfering beams, decreasing a transmit power level of the identified interfering signals, and executing at least part of the mobility procedure while the identified interfering signals use the decreased transmit power level. The mobility procedure may, typically, comprise transmission of a reference signal on each of one or more candidate beams (wherein the reference signals are for measurement by the wireless communication device), reception of a report from the wireless communication device (wherein the report is indicative of a result of measurements of the reference signals and is for making a beam switch decision), and execution of the beam switch (if applicable). Corresponding computer program product, arrangement and network node are also disclosed.

26 Claims, 2 Drawing Sheets

(51) Int. Cl.
- *H04W 36/30* (2009.01)
- *H04W 52/14* (2009.01)
- *H04B 7/08* (2006.01)
- *H04W 52/24* (2009.01)
- *H04W 16/28* (2009.01)
- *H04W 36/00* (2009.01)
- *H04W 24/10* (2009.01)

(52) U.S. Cl.
CPC ....... *H04W 52/143* (2013.01); *H04W 52/243* (2013.01); *H04W 16/28* (2013.01); *H04W 24/10* (2013.01); *H04W 36/0088* (2013.01); *Y02D 70/00* (2018.01)

(58) Field of Classification Search
CPC . H04W 16/28; H04W 24/10; H04W 36/0088; Y02D 70/00
USPC ................ 375/267, 260, 259, 316, 295, 219
See application file for complete search history.

(56) References Cited

U.S. PATENT DOCUMENTS

| | | | |
|---|---|---|---|
| 2014/0185481 A1* | 7/2014 | Seol ...................... | H04W 52/42 370/252 |
| 2016/0044551 A1* | 2/2016 | Frenger ................ | H04B 7/0617 370/252 |

FOREIGN PATENT DOCUMENTS

| | | |
|---|---|---|
| EP | 2413624 A1 | 2/2012 |
| EP | 2999141 A1 | 2/2012 |
| EP | 2549814 A1 | 1/2013 |
| EP | 2663116 A1 | 11/2013 |
| JP | 2012147125 A | 8/2012 |
| JP | 2013121087 A | 6/2013 |
| WO | 2010110344 A1 | 10/2012 |
| WO | 2014185676 | 11/2014 |

* cited by examiner

BEAM SWITCHING IN A CELLULAR NETWORK WHERE THE NETWORK NODES SUPPORT A PLURALITY OF BEAMS

TECHNICAL FIELD

The present invention relates generally to the field of mobility in wireless communication systems. More particularly, it relates to mobility in systems applying signal beam-forming.

BACKGROUND

In a typical cellular communication system, it is important to enable handover functionality. Handover is the process of transferring control over an ongoing connection between a (mobile) wireless communication device and the network providing the cellular communication system from one network node (the serving network node, providing a serving cell) to another network node (the target network node, providing a target cell). Handover is typically provided to accomplish a transparent service for the wireless communication device over a geographical area which extends beyond the coverage area of a single network node. Preferably, a handover should be performed without any loss of data and without any (or with minimal) interruption in the communication of the ongoing connection.

Enabling of handover functionality typically comprises finding of a suitable target cell and ensuring (or making probable) that it is possible to sustain reliable communication with the found suitable target cell.

Candidate cells (provided by candidate network nodes) for finding of the suitable target cell are typically stored in neighbor lists, which may be stored at the serving network node or elsewhere in (or in association with) the network providing cellular communication system, as suitable.

To evaluate whether it is possible to sustain reliable communication with any of the candidate cells, the quality of a possible connection between the wireless communication device and the candidate cell are typically estimated before a decision to perform a handover takes place. Such estimation may typically be done based on downlink measurements carried out by the wireless communication device on reference signals transmitted by the candidate cells and reported to the serving network node.

In many typical cellular communication systems, each network node continuously transmits reference signals (e.g. pilot signals) that wireless communication devices in neighbor cells may use to estimate the quality of a possible connection with the network node. Examples of such reference signals comprise BCCH (broadcast control channel) in GSM (Global System for Mobile communication), CPICH (common pilot channel) in UMTS (Universal Mobile Telecommunication System), CRS (cell specific reference signal) in UMTS-LTE (UMTS, Long Term Evolution) and beacon signals in the IEEE (Institute of Electrical and Electronics Engineers) 802.11 standards.

Many emerging cellular communication systems may use advanced antenna systems to enable communication in narrow beams directed from the serving network node towards the wireless communication device, so-called beam-forming. Beam-forming may be used to enable high signal strength in the direction of the beam while the interference caused in other directions is kept low. Another advantage of beam-forming is that the coverage area of a network node may be increased.

In systems employing beam-forming, there is typically a need for a beam switch functionality, typically including switches between beams supported by the same network node as well as switches between beams supported by different network nodes (i.e. handover). In analogy with the established handover terminology, the beam before a beam switch is called the serving beam and the beam that will be used after the beam switch is called the target beam.

Throughout this disclosure, the term beam switch will be used to cover both the case where the serving beam and the target beam are supported by the same network node (i.e. when the beam switch does not involve a handover between network nodes, an intra-node beam switch) and the case where the serving beam and the target beam are supported by different network nodes (i.e. when the beam switch involves a handover between network nodes, an inter-node beam switch).

Transmitting reference signals in all beams continuously to enable measurements for beam switch decisions is not particularly efficient when a beam-forming system has a large number of narrow of beams. One reason is that, in some typical scenarios, only a few (or no) beams supported by a network node are active (e.g. used for a connection with a wireless communication device) and transmitting reference signals in the rest of the beams would only consume power, add interference and require extra hardware resources.

An alternative approach is to have only a subset of candidate beams transmitting reference signals, and only when it is probable that a beam switch (with or without a handover) is needed. Such reference signals may be termed mobility reference signals (MRS) and may, for example, have a similar physical structure to a secondary synchronization signal (SSS) as defined in UMTS-LTE or any other suitable signal structure.

To determine when it is probable that a beam switch is needed, the serving network node may use uplink measurements (typically making some assumptions regarding reciprocity) and/or channel quality reports from the wireless communication device regarding the connection. When the serving node determines that it is probable that a beam switch is needed it may trigger a mobility procedure, where the candidate beams transmit reference signals and the wireless communication device can perform and report measurements of the reference signals to the serving network node for the beam switch decision. The serving network node may inform the wireless communication device about the timing (e.g. start and/or end) and/or content (e.g. signal sequences) of the reference signals in association with triggering the mobility procedure.

Which beams to use as candidate beams may, for example, be based on content of a database (e.g. a mobility look-up table, LuT). Such a database may (in analogy with the neighbor cell list) comprise information regarding candidate beams for each serving beam and/or for each geographical location of the wireless communication device. The database may be formed and/or up-dated in any suitable way. For example, it may be based on system set-up parameters and/or on statistics regarding previous beam switches and/or measurements. The candidate beams for a serving beam may, for example, comprise beams that have been used before and/or after a beam switch to/from the serving beam, beams that have been associated with strong reference signal measurements for the serving beam, and/or beams adjacent to the serving beam and supported by the serving network node. The candidate beams for a geographical position may, for example, comprise beams that have been associated with strong reference signal measurements for the geographical position, and/or any combination with information regarding serving beam. The database may, additionally, comprise (average) signal levels of the reference signals for some of the candidate beams (e.g. the strongest) based on earlier measurements for each serving beam and/or geographical position.

One problem with beam-forming systems (especially systems with narrow beams) is that in some situations, the signal power (and typically the signal-to-interference ratio) may decrease a lot during a very short time span. This time span may be so short that there is not enough time to determine that it is probable that a beam switch is needed, to trigger a mobility procedure and to complete a beam switch. Thus, the connection between the wireless communication device and the network may be lost (e.g. due to out-of-sync and subsequent radio link failure).

FIG. 1 illustrates an example scenario where a sudden drop of the signal strength and signal-to-interference ratio may be experienced such that there is not enough time to prepare for and carry out a beam switch as needed.

In FIG. 1, a wireless communication device has an ongoing connection with network node 120 via beam 110 when the wireless communication device is in position 100a. When the wireless communication device moves around a corner of a building 130 it ends up in a new position 100b where signals of the beam 110 cannot reach it (or reaches it with a very low signal level) due to shadowing by the building 130. Furthermore, interfering beams 111 (from network node 120, reflected of the building 131) and 112 (from network node 121) may be received at high signal levels by the wireless communication device in position 100b, which results in a low signal-to-interference ratio.

Since the process of moving around the corner may be fast, the signal power of beam 110 (and the signal-to-interference ratio) may drop very quickly and the connection between the wireless communication device and the network may be lost as explained above.

Thus, there is a need for improved (or at least alternative) approaches to mobility in cellular communication systems employing beam-forming.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The inventors have realized that a transmit power level of interfering signals of interfering beams may be decreased during at least part of the mobility procedure to lower the risk of losing the connection between the wireless communication device and the network via the current serving beam.

According to a first aspect, this is enabled by a method for a network node of a cellular communication network, wherein the network node and at least some other network nodes of the cellular communication network are each adapted to support a plurality of beams of a signal beam-forming scheme and to communicate with a wireless communication device using at least one of the plurality of beams (the serving beam(s)).

The method comprises initiating a mobility procedure, identifying interfering signals transmitted by one or more interfering beams, decreasing a transmit power level of the identified interfering signals, and executing at least part of the mobility procedure while the identified interfering signals use the decreased transmit power level.

The signal beam-forming scheme may, for example, be a MIMO (multiple-input, multiple-output) scheme, a massive-MIMO scheme, or any beam-forming scheme employing narrow beams. A beam-forming scheme employing narrow beams may, for example, be defined as a beam-forming scheme where a network node supports at least 50, 100 or 200 beams in different directions.

The case where network nodes of the cellular communication network are each adapted to support a plurality of beams of a signal beam-forming scheme and to communicate with a wireless communication device using at least one of the plurality of beams is used as a non-limiting example in this disclosure.

Communication with the wireless communication device using at least one of the plurality of beams may comprise using one or more of the plurality of beams. In this disclosure, the case where communication with the wireless communication device uses one of the plurality of beams is used as a non-limiting example.

The identification of the interfering signals may, for example, comprise considering one or more candidate beams identified via the database described in the background section as the interfering beams. The identification of the interfering signals may, alternatively or additionally, comprise considering the interfering signals to be some or all signals on the interfering beams (e.g. all signals on the interfering beams except reference signals and/or other mobility procedure related signals, such as handover commands).

The candidate beams and/or the interfering beams may be supported by the network node or by another network node. In the latter case, signaling between the network nodes may be implied.

It should be noted that the transmit power may be decreased on all or only some (e.g. the strongest) of the interfering beams, and that the decrease may differ between different interfering beams and/or different interfering signals.

If an interfering beam is supported by another (interfering) network node, decreasing the power level of the interfering signal(s) of that interfering beam may comprise transmitting a transmit power level reduction request to the interfering network node. The transmit power level reduction request may comprise an identification of the interfering beam and/or of the interfering signal(s).

In some embodiments, the method may further comprise detecting a decreasing (or low) signal quality. A decreasing signal quality may be detected in any suitable way, for example, via uplink measurements (e.g. decreasing signal-to-interference ratio or a signal-to-interference ratio being below a threshold) or via channel quality reports (e.g. channel quality indication—CQI—or channel state information—CSI) from the wireless communication device.

Additionally or alternatively, the method may, according to some embodiments, further comprise detecting a signal environment statistics of a location of the wireless communication device indicating that a signal-to-interference ratio of the location is below a signal-to-interference ratio threshold. The statistics may, for example, be acquired using the database described in the background section.

Additionally or alternatively, the method may, according to some embodiments, further comprise detecting a failure of a mobility procedure. Detecting a failure of the mobility procedure may, for example, comprise detecting absence of an expected signal (e.g. a message or acknowledgement message of the mobility procedure), detecting out-of-sync or detecting radio link failure.

At least the decreasing of the transmit power level of the identified interfering signals may, according to some embodiments, be performed in response to detecting either or any combination of (as applicable) the decreased signal quality, the signal environment statistics indicating the signal-to-interference ratio being below the signal-to-interference ratio threshold, and the failure of the mobility procedure. On other embodiments, decreasing the transmit power level of the identified interfering signals is always performed when a mobility procedure is initiated.

According to some embodiments, the initiation of the mobility procedure may be performed in response to detecting either or any combination of (as applicable) the decreased signal quality, the signal environment statistics indicating the signal-to-interference ratio being below the signal-to-interference ratio threshold, and the failure of the mobility procedure.

In some embodiments, the method may further comprise restoring the transmit power level of the identified interfering signals after the part of the mobility procedure has been executed.

The mobility procedure may, according to some embodiments, comprise at least transmission of a reference signal on each of one or more candidate beams (wherein the reference signals are for measurement by the wireless communication device) and reception of a report from the wireless communication device (wherein the report is indicative of a result of measurements of the reference signals and is for making a beam switch decision).

The candidate beams may, for example, be identified using the database described in the background section. The set of candidate beams may be the same or different than the set of interfering beams.

The mobility procedure may further comprise execution of the beam switch according to some embodiments.

The beam switch may comprise causing the communication with the wireless communication device to use a target beam, wherein one of the candidate beams is selected as the target beam based on the report.

The selection of one of the candidate beams as the target beam may be performed by the network node supporting the serving beam, or it may be performed by a network node supporting the target beam, or (in a more general case) by a network node supporting any of the candidate beams (typically the network node receiving the report from the wireless communication device).

In some embodiments, decreasing the transmit power of the identified interfering signals may comprise halting data transmission using the one or more interfering beams.

In some embodiments, decreasing the transmit power of the identified interfering signals may comprise refraining from using one or more radio resources (e.g. radio resources overlapping with those used for reference signals) of the one or more interfering beams.

According to some embodiments, the method may further comprise transmitting an indication regarding the decreased transmit power level of the identified interfering signals to the wireless communication device. For example, the indication may comprise information regarding for which beams and/or radio resources the transmit power level is decreased.

The interfering signals may be uplink signals transmitted by one or more other wireless communication devices according to some embodiments. In these embodiments, the part of the mobility procedure executed while the identified interfering signals use the decreased transmit power level may, for example, comprise uplink measurements by the network node on signals transmitted from the wireless communication device.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is an arrangement for a network node of a cellular communication network, wherein the network node and at least some other network nodes of the cellular communication network are each adapted to support a plurality of beams of a signal beam-forming scheme and to communicate with a wireless communication device using at least one of the plurality of beams.

The arrangement comprises a controller adapted to cause initiation of a mobility procedure, identification of interfering signals transmitted by one or more interfering beams, decrease of a transmit power level of the identified interfering signals, and execution of at least part of the mobility procedure while the identified interfering signals use the decreased transmit power level.

The third aspect may additionally have features identical with or corresponding to any of the various features as explained above for the first aspect.

A fourth aspect is a network node of a cellular communication network comprising the arrangement according to the third aspect.

In some embodiments, any of the above aspects may additionally have features identical with or corresponding to any of the various features as explained above for any of the other aspects, as suitable.

An advantage of some embodiments is that the possibility to complete a beam switch (or any other appropriate part of a mobility procedure) is improved.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described in which a beam-forming system applies an approach where the transmit power of one or more interfering signals (of one or more interfering beams) is decreased to enable a mobility procedure being carried out.

This is particularly beneficial when the signal-to-interference ratio (SIR) of the serving beam drops drastically, such that there is not enough time to carry out the mobility procedure before the signal-to-interference ratio is so poor that reliable communication via the serving beam is not possible. Thus, the approach may be seen as a link recovery process.

In some embodiments, the transmit power decrease of the interfering signals is accomplished by a scheduler. For example, the scheduler may be seen as intervening in the mobility procedure.

As explained above, FIG. 1 describes a scenario where the signal-to-interference ratio drops very quickly due to a sudden shadowing effect (moving around a corner in the example of FIG. 1).

A low SIR is due to low signal power and/or high interference power. In many cases, high interference is the main problem. Thus, the SIR may be low even if the received signal power is at an acceptably high level compared to the receiver noise floor. This situation is addressed according to some embodiments by decreasing the transmit power of one or more of the interfering signals.

The interfering signals may, for example, be identified as signals transmitted by one or more interfering beams belonging to a list of candidate beams for a beam switch of the mobility procedure (the candidate beams, for example, being available from a database comprising candidate beams for each serving beam and/or for each geographical position). The interfering signals may be identified as all signals transmitted by the interfering beams or only some of the signals transmitted by the interfering beams. Decreasing the transmit power of a signal may comprise halting the transmission of the signal completely. In a typical example, signals transmitted by the interfering beams and on radio resources overlapping those that will be used to transmit signals (e.g. reference signals and/or beam switch handshaking signals) for the mobility procedure are halted while the signals for the mobility procedure are transmitted (e.g. reference signals transmitted by the candidate beams, which may or may not coincide with the interfering beams).

The link may, thus, be rescued temporarily by halting (or decreasing in power) interfering signals on interfering beams for the duration required to perform (part of) a mobility procedure.

Figure 1:
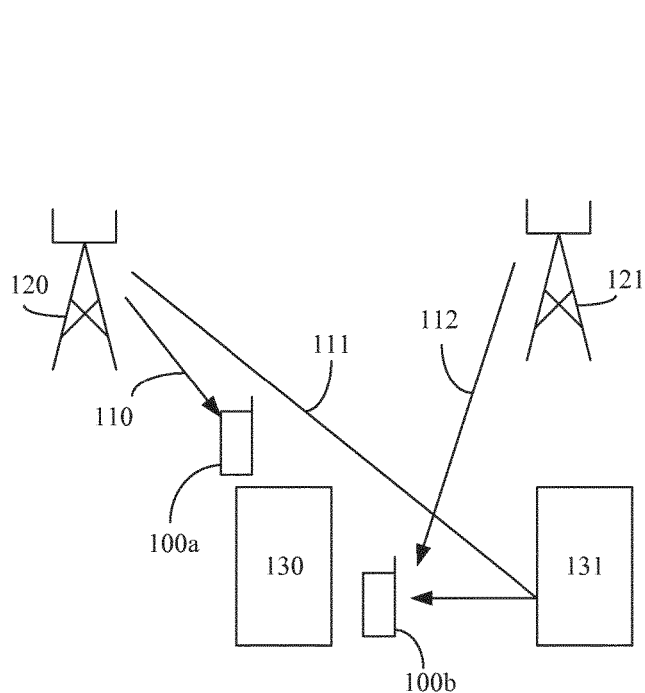
FIG. 1 is a schematic drawing illustrating an example scenario where some embodiments may be applicable.
Figure 2:
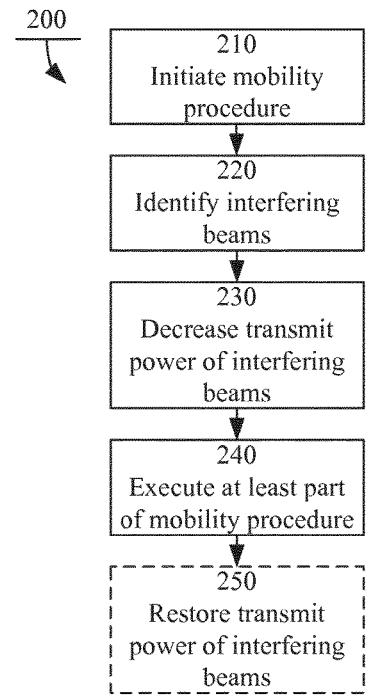
FIG. 2 is a flowchart illustrating example method steps according to some embodiments.

FIG. 2 illustrates and example method 200 according to some embodiments. The method 200 is for a network node (e.g. network node 120 of FIG. 1) of a cellular communication network, wherein network nodes of the cellular communication network are each adapted to support a plurality of beams of a signal beam-forming scheme and to communicate with a wireless communication device (e.g. wireless communication device 100a, 100b of FIG. 1) using one of the plurality of beams.

The method starts in step 210 where a mobility procedure is initiated. The mobility procedure typically comprises transmission of a reference signal (for measurement by the wireless communication device) on each of one or more candidate beams, reception of a report (indicative of a result of the measurements) from the wireless communication device, and execution of a beam switch (if it is decided based on the report to make such beam switch). The mobility procedure may also comprise other signaling as suitable.

Initiation of the mobility procedure according to step 210 may, for example, be triggered by detection of a poor or decreasing signal quality (e.g. a SIR falling below a threshold, a channel quality report from the wireless communication device indicating low quality, etc.), and/or by detection of the wireless communication device being in a position where statistics (e.g. of the database) indicate a risk to lose the connection (e.g. low SIR, earlier link failure, etc.).

In step 220, one or more interfering beams (carrying interfering signals) are identified. Typically, the interfering beams are (some of, e.g. the strongest of) the candidate beams for a beam switch as indicated by the database. The strongest interferer is often transmitted on the beam that will turn out as the target beam for the beam switch of the mobility procedure. Then, in step 230, the transmit power level of interfering signals of the interfering beams are decreased.

Decreasing the transmit power level of the interfering signals may comprise completely halting the interfering signals or merely lowering the transmit power level.

The interfering signals may, for example, be all signals transmitted by the interfering beams, or only signals using radio resources that overlap with radio resources used by the mobility procedure.

In some embodiments, step 230 may also comprise transmitting an indication regarding the decreased transmit power level of the identified interfering signals to the wireless communication device. Such indication may, for example, comprise information regarding which beams and radio resources will undergo the transmit power decrease.

Steps 220 and 230 may be performed for every time a mobility procedure is initiated. Alternatively, steps 220 and 230 may be performed only if the initiated mobility procedure fails (e.g. if a message of the procedure is not received as expected), and/or if it is detected that the wireless communication device is in a position where statistics (e.g. of the database) indicate a risk to lose the connection (e.g. low SIR, earlier link failure, etc.).

At least part of the mobility procedure is then executed while the identified interfering signals use the decreased transmit power level as indicated by step 240. Optionally, the transmit power level of one or more of the interfering signals may be restored (or at least increased) thereafter as illustrated by step 250.

Step 240 may comprise executing the entire mobility procedure, only a last part of the mobility procedure (a first part being performed before step 230, and possibly also before step 220), only a first part of the mobility procedure (a last part being performed after step 250), or only a middle part of the mobility procedure (a first part being performed before step 230, and possibly also before step 220, and a last part being performed after step 250).

Figure 3A:
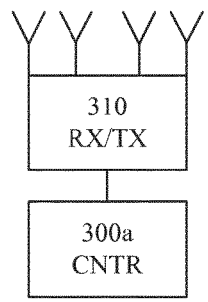
FIG. 3A is a block diagram illustrating an example arrangement according to some embodiments.
Figure 3B:
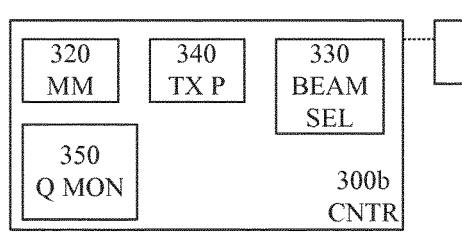
FIG. 3B is a block diagram illustrating an example arrangement according to some embodiments

FIGS. 3A and 3B illustrate example arrangements for a network node (e.g. network node 120 of FIG. 1) of a cellular communication network, wherein the network node and at least some other network nodes of the cellular communication network are each adapted to support a plurality of beams of a signal beam-forming scheme and to communicate with a wireless communication device (e.g. wireless communication device 100a, 100b of FIG. 1) using one of the plurality of beams. The arrangements of FIGS. 3A and 3B may, for example, be adapted to execute (or at least cause execution of) the various method steps described in connection to FIG. 2.

The arrangement of FIG. 3A comprises a controller (CNTR) 300a operatively connected to a transceiver (RX/TX) 310 which may or may not be comprised in the arrangement.

FIG. 3B shows an example controller (CNTR) 300b which may or may not be an implementation of the controller 300a of FIG. 3A.

The controller 300a, 300b is adapted to cause initiation of a mobility procedure (compare with step 210 of FIG. 2). For example, the controller 300a, 300b may be adapted to initiate the mobility procedure (e.g. by instructing the candidate beams to transmit reference signals and by transmitting, via the transceiver 310, instructions to the wireless communication device to perform measurements thereon).

The controller 300b may comprise a mobility manager (MM) 320 adapted to initiate and control the mobility procedure.

The controller 300b may also comprise a quality monitor (Q MON) 350 adapted to monitor a signal quality of the communication link, where detection of a decreasing (or low) signal quality may trigger the initiation of the mobility procedure as explained above.

Alternatively or additionally, the controller 300b may be associated with a database (DB) 315 comprising information as described above. The information in the database may be used to trigger the initiation of the mobility procedure as explained above.

The controller 300a, 300b is also adapted to cause identification of interfering signals transmitted by one or more interfering beams (compare with step 220 of FIG. 2). For example, the controller 300a, 300b may be adapted to identify the interfering signals and the interfering beams. To this end, the controller 300b may comprise a beam selector (BEAM SEL) 330 adapted to identify the interfering beams.

As explained above, the interfering beams may be a subset of the candidate beams provided by a database (DB) 315. The database may be comprised in, or otherwise associated with, the network node. For example, the database may be a cloud-based service shared by some or all of the network nodes of the cellular communication system.

The controller 300a, 300b is further adapted to cause decrease of a transmit power level of the identified interfering signals (compare with step 230 of FIG. 2). For example, the controller 300a, 300b may be adapted to decrease the transmit power level of the identified interfering signals (e.g. by instructing the interfering beams to transmit at a lower transmit power level or to halt transmission). The decrease of the transmit power level may be controlled by a scheduler according to some embodiments.

The controller 300b may comprise a transmit power controller (TX P) 340 adapted to cause the decrease of a transmit power level. In some embodiments, the transmit power controller is comprised in a scheduler of the network node. In other embodiments, the transmit power controller is associated with a scheduler which is not comprised in the network node.

The controller 300a, 300b is then adapted to cause (e.g. by the mobility manager 320) execution of at least part of the mobility procedure while the identified interfering signals use the decreased transmit power level (compare with step 240 of FIG. 2). For example, the controller 300a, 300b may be adapted to execute at least part of the mobility procedure while the identified interfering signals use the decreased transmit power level.

The transmit power controller 340 (and possibly the beam selector 330) may, for example, be activated every time a mobility procedure is initiated, or only if the initiated mobility procedure fails (e.g. if a message of the procedure is not received as expected) and/or if it is detected that the wireless communication device is in a position where statistics (e.g. of the database) indicate a risk to lose the connection (e.g. low SIR, earlier link failure, etc.).

The controller 300a, 300b may also be adapted to cause (e.g. by the transmit power controller 340) restoration of the transmit power level of the identified interfering signals after the part of the mobility procedure has been executed (compare with step 250 of FIG. 2). For example, the controller 300a, 300b may be adapted to restore the transmit power level of the identified interfering signals after the part of the mobility procedure has been executed.

Figure 4:
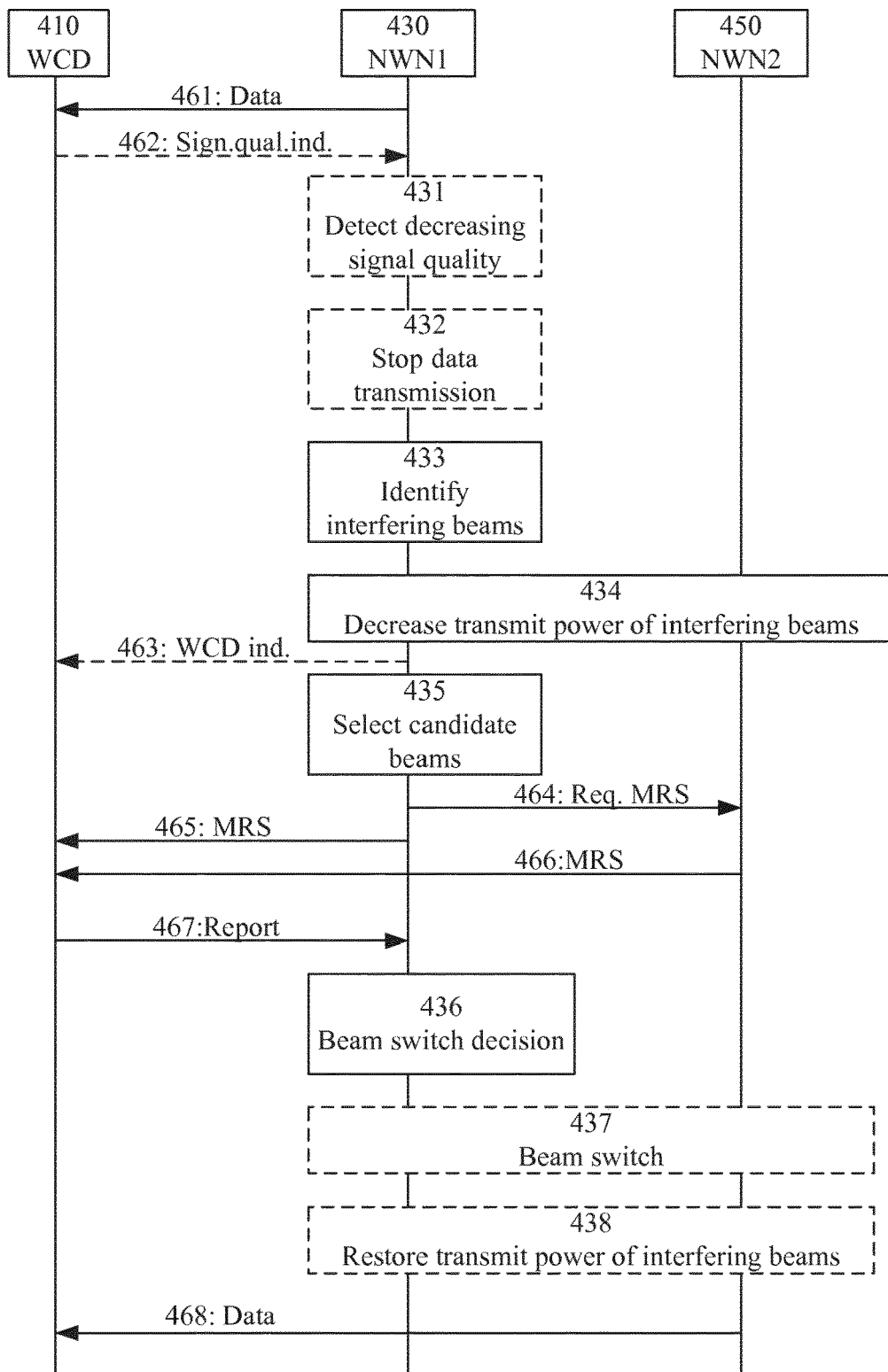
FIG. 4 is a signaling diagram illustrating example signaling and method steps according to some embodiments.

FIG. 4 illustrates example signaling and method steps of a network node (NWN1, compare with network node 120 of FIG. 1) 430 supporting the serving beam, a wireless communication device (WCD, compare with the wireless communication device 100a, 100b of FIG. 1) 410, and another network node (NWN2, compare with network node 121 of FIG. 1) 450. The network node 430 may, for example, be adapted to execute (or at least cause execution of) the various method steps described in connection to FIG. 2.

During transmission of data 461 from the network node 430 to the wireless communication device 410 via the serving beam, the wireless communication device 410 sends signal quality indications (sign.qual.ind) 462 to the network node 430. The signal quality indications 462 may be transmitted in a regular fashion (e.g. CQI, CSI, etc.) and/or when the wireless communication device detects that the signal quality is low/decreasing (e.g. SIR below a threshold, expected message—e.g. ACK/NAK—not received, inability to decode received data, etc.).

When the network node 430 detects decreasing/low signal quality in step 431 (e.g. based on SIR measurements, received CSI, received CQI, or similar) or when the network node 430 receives an indication that the wireless communication device 410 has detected decreasing/low signal quality, it may initiate a mobility procedure (compare with step 210 of FIG. 2). In association with the initiation of the mobility procedure, the transmission of data 461 to the wireless communication device may be halted as illustrated in step 432 to avoid loss of data (or unnecessary transmission of data that will have to be retransmitted anyway) and/or to not impair the mobility procedure.

Interfering beams (and interfering signals thereon) are identified by the network node 430 in step 433 (compare with step 220 of FIG. 2). As mentioned above, the interfering beams may, for example, be identified as one or more strongest candidate beams (according to a database).

Then, the transmit power levels of the interfering signals are decreased as illustrated in step 434 (compare with step 230 of FIG. 2). If interfering beams are supported by another network node, e.g. network node 450, this step may involve signaling between the network nodes 430 and 450. Step 434 may, for example, comprise halting data transmission of the interfering beams on radio resources reserved for reference signaling of the mobility procedure (e.g. MRS—mobility reference signals).

In some embodiments, the wireless communication device 410 is notified regarding the decreased power levels of the interfering beams as illustrated by signaling of an indication (WCD ind.) 463.

The mobility procedure may be executed (at least in part) while the interfering signals use the decreased transmit power level (or are completely muted).

Execution of the mobility procedure (compare with step 240 of FIG. 2) is represented in FIG. 4 by selection by the network node 430 of candidate beams (e.g. from a database) in step 435, initiating MRS signaling on the candidate beams (which may include transmitting a request for MRS signaling (req. MRS) 464 to other network nodes supporting candidate beams), MRS signaling 465, 466 by the candidate beams, reporting MRS measurements 467 by the wireless communication device 410, taking a beam switch decision 436 by the network node and performing the beam switch 437 as applicable (which may include a handover to another network node depending on which network node supports the target beam of the beam switch). Numerous variations compared to the execution of the mobility procedure described here may be envisioned. For example, other steps and/or signals may also be present (e.g. measurement configuration of the wireless communication device, acknowledgement of measurement configuration, MRS request 464, report 467, signaling in connection to the beam switch, etc.)

When the mobility procedure has been executed (at least in part) the transmit power level of the interfering signals may be restored as illustrated by step 438 (compare with step 250 of FIG. 2) before, or after, transmission of data 468 to the wireless communication device continues via the new serving beam. If interfering beams are supported by another network node and/or if the beam switch has been to another network node, step 438 may involve signaling between network nodes.

FIG. 4 illustrates a situation where the transmit power level of interfering signals is decreased very early in the mobility procedure and the transmit power level of interfering signals is restored very late in the mobility procedure. Hence, most of the mobility procedure is executed while the transmit power level of the interferers is at the decreased level. It should be noted, however, that this is merely an example and other timing of steps 433, 434 and 438 may be envisioned. For example, steps 433 and 434 may be performed at a later stage (e.g. if the mobility procedure fails).

Typically, the mobility reference signals themselves (that might be transmitted on one or more of the interfering beams—those that coincide with candidate beams) are not defined as interfering signals. Hence, the transmit power of the mobility reference signals is typically not reduced. The same may apply to other signals relating to the mobility procedure transmitted on one or more of the interfering beams.

The risk to lose the connection that has been discussed above as a trigger for the decrease of the transmit power level of interfering signals may be estimated in various ways. Above, the estimation has been exemplified via position of the wireless communication device mapped to statistics (low SIR, earlier link failure, etc.) of the database. This example may be supplemented by a speed of the wireless communication device (which may, for example, be estimated based on a Doppler spread reported by the wireless communication device). If the speed is above a threshold, the risk of losing the connection may be higher than otherwise. The threshold value may be stored in the database and associated with a position of the wireless communication device.

The speed threshold could initially be set to a large value (e.g. 500 km/h) and if radio link failure (RLF) is detected for a lower speed, the speed threshold could be lowered. Alternatively or additionally, the network could (slowly) increase the threshold associated with a position if there has not been a RLF during a long time period (e.g. one week) at the position.

In some embodiments, the above-described procedure may be applied for uplink measurements (e.g. when precoding of uplink beam-forming need to be determined before a beam switch as described above can be completed). Then, measurements to be performed by the network node on signals transmitted from the wireless communication device may be interfered by signals transmitted from other wireless communication devices.

In such a method, the network node may identify the interfering signals transmitted by one or more interfering beams as the signals transmitted from other wireless communication devices and decrease their transmit power level while executing at least part of the mobility procedure (e.g. performing the uplink measurements and adjusting the precoding of the wireless communication device).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as network node) comprising circuitry/logic or performing methods according to any of the embodiments. The electronic apparatus may, for example, be a base station.

Figure 5:
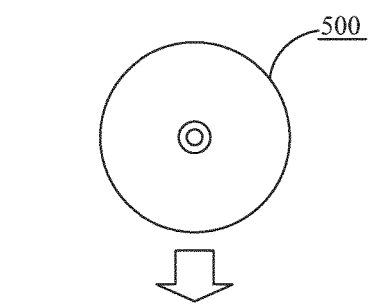
FIG. 5 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 500 illustrated in FIG. 5. The computer readable medium may have stored thereon a computer program comprising program instructions. The computer program may be loadable into a data-processing unit (PROC) 510, which may, for example, be comprised in a network node 530. When loaded into the data-processing unit, the computer program may be stored in a memory (MEM) 520 associated with or integral to the data-processing unit. According to some embodiments, the computer program may, when loaded into and run by the data-processing unit, cause the data-processing unit to execute method steps according to, for example, the methods shown in any of the FIGS. 2 and 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for a network node of a cellular communication network, wherein the network node and at least some other network nodes of the cellular communication network are each adapted to support a plurality of beams of a signal beam-forming scheme and to communicate with a wireless communication device using at least one of the plurality of beams, the method comprising:

initiating a mobility procedure;
identifying interfering signals transmitted by one or more interfering beams;
decreasing a transmit power level of the identified interfering signals; and
executing at least part of the mobility procedure while the identified interfering signals use the decreased transmit power level.

2. The method of claim 1, further comprising restoring the transmit power level of the identified interfering signals after the part of the mobility procedure has been executed.

3. The method of claim 1, wherein the mobility procedure comprises at least:
transmission of a reference signal on each of one or more candidate beams, wherein the reference signals are for measurement by the wireless communication device; and
reception of a report from the wireless communication device, wherein the report is indicative of a result of measurements of the reference signals and is for making a beam switch decision.

4. The method of claim 3, wherein the mobility procedure further comprises execution of the beam switch.

5. The method of claim 1, further comprising detecting a decreasing signal quality, and wherein the mobility procedure is initiated in response to detecting the decreased signal quality.

6. The method of claim 5, further comprising receiving a signal quality indication from the wireless communication device, and wherein the decreased signal quality is detected based on the signal quality indication.

7. The method of claim 1, wherein the transmit power level of the identified interfering signals is decreased if signal environment statistics of a location of the wireless communication device indicates that a signal-to-interference ratio of the location is below a signal-to-interference ratio threshold.

8. The method of claim 1, wherein the transmit power level of the identified interfering signals is decreased in response to detecting a failure of the mobility procedure.

9. The method of claim 1, wherein decreasing the transmit power of the identified interfering signals comprises halting data transmission using the one or more interfering beams.

10. The method of claim 1, wherein decreasing the transmit power of the identified interfering signals comprises refraining from using one or more radio resources of the one or more interfering beams.

11. The method of claim 1, further comprising transmitting an indication regarding the decreased transmit power level of the identified interfering signals to the wireless communication device.

12. The method of claim 1, wherein the interfering signals are uplink signals transmitted by one or more other wireless communication devices.

13. A non-transitory computer readable recording medium storing a computer program product for controlling a network node of a cellular communication network, wherein the network node and at least some other network nodes of the cellular communication network are each adapted to support a plurality of beams of a signal beam-forming scheme and to communicate with a wireless communication device using at least one of the plurality of beams, the computer program product comprising software instructions which, when run on processing circuitry of the network node, causes the network node to:
initiate a mobility procedure;
identify interfering signals transmitted by one or more interfering beams;
decrease a transmit power level of the identified interfering signals; and
execute at least part of the mobility procedure while the identified interfering signals use the decreased transmit power level.

14. An arrangement for a network node of a cellular communication network, wherein the network node and at least some other network nodes of the cellular communication network are each adapted to support a plurality of beams of a signal beam-forming scheme and to communicate with a wireless communication device using at least one of the plurality of beams, the arrangement comprising:
processing circuitry;
memory containing instructions executable by the processing circuitry whereby the arrangement is operative to cause:
initiation of a mobility procedure;
identification of interfering signals transmitted by one or more interfering beams;
decrease of a transmit power level of the identified interfering signals; and
execution of at least part of the mobility procedure while the identified interfering signals use the decreased transmit power level.

15. The arrangement of claim 14, wherein the instructions are such that the arrangement is operative to cause restoration of the transmit power level of the identified interfering signals after the part of the mobility procedure has been executed.

16. The arrangement of claim 14, wherein the mobility procedure comprises at least:
transmission of a reference signal on each of one or more candidate beams, wherein the reference signals are for measurement by the wireless communication device; and
reception of a report from the wireless communication device, wherein the report is indicative of a result of measurements of the reference signals and is for making a beam switch decision.

17. The arrangement of claim 16, wherein the mobility procedure further comprises execution of the beam switch.

18. The arrangement of claim 14, wherein the instructions are such that the arrangement is operative to cause detection of a decreasing signal quality, and wherein the initiation of the mobility procedure is in response to detecting the decreased signal quality.

19. The arrangement of claim 18, wherein the instructions are such that the arrangement is operative to cause the detection of a decreasing signal quality based on a signal quality indication received from the wireless communication device.

20. The arrangement of claim 14, wherein the instructions are such that the arrangement is operative to cause the decrease of the transmit power level of the identified interfering signals if signal environment statistics of a location of the wireless communication device indicates that a signal-to-interference ratio of the location is below a signal-to-interference ratio threshold.

21. The arrangement of claim 14, wherein the instructions are such that the arrangement is operative to cause the decrease of the transmit power level of the identified interfering signals in response to detecting a failure of the mobility procedure.

22. The arrangement of claim 14, wherein the instructions are such that the arrangement is operative to cause the decrease of the transmit power of the identified interfering signals by halting data transmission using the one or more interfering beams.

23. The arrangement of claim 14, wherein the instructions are such that the arrangement is operative to cause the decrease of the transmit power of the identified interfering signals by refraining from using one or more radio resources of the one or more interfering beams.

24. The arrangement of claim 14, wherein the instructions are such that the arrangement is operative to cause transmission of an indication regarding the decreased transmit power level of the identified interfering signals to the wireless communication device.

25. The arrangement of claim 14, wherein the interfering signals are uplink signals transmitted by one or more other wireless communication devices.

26. A network node of a cellular communication network, wherein the network node and at least some other network nodes of the cellular communication network are each adapted to support a plurality of beams of a signal beamforming scheme and to communicate with a wireless communication device using at least one of the plurality of beams, the network node comprising:
  processing circuitry;
  memory containing instructions executable by the processing circuitry whereby the network node is operative to cause:
    initiation of a mobility procedure;
    identification of interfering signals transmitted by one or more interfering beams;
    decrease of a transmit power level of the identified interfering signals; and
    execution of at least part of the mobility procedure while the identified interfering signals use the decreased transmit power level.

* * * * *